United States Patent [19]

Kyutoku et al.

[11] Patent Number: 4,996,102
[45] Date of Patent: Feb. 26, 1991

[54] COMPOSITE NON-WOVEN FABRIC MATERIAL

[75] Inventors: Hirofumi Kyutoku, Ikoma; Hiroyuki Matsuoka, Mie; Yoshihisa Otani, Himeji, all of Japan

[73] Assignee: Osaka Gas Company, Limited, Osaku, Japan

[21] Appl. No.: 371,752

[22] Filed: Jun. 27, 1989

[30] Foreign Application Priority Data

Jun. 30, 1988 [JP]  Japan .................................. 63-164298

[51] Int. Cl.$^5$ ............................................. B32B 15/00
[52] U.S. Cl. ................................... 428/285; 428/284; 428/297; 428/298; 428/299; 428/408; 428/300
[58] Field of Search .............. 428/285, 300, 298, 297, 428/299, 284, 408

[56]      References Cited
       U.S. PATENT DOCUMENTS

| | | | |
|---|---|---|---|
| 4,112,175 | 9/1978 | Kikuchi et al. | 428/285 |
| 4,842,945 | 6/1989 | Ito et al. | 428/408 |
| 4,935,291 | 6/1990 | Gunnink | 428/285 |

*Primary Examiner*—James J. Bell
*Attorney, Agent, or Firm*—Spencer & Frank

[57]            ABSTRACT

The present invention provides a composite non-woven fiber material comprising at least one stainless steel fiber layer and at least one carbon fiber layer, the alternating stainless steel fiber layers and carbon fiber layers being intimately interlocked to form integrated composite material, at least one exposed surface layer of the composite material being a stainless steel fiber layer.

21 Claims, 1 Drawing Sheet

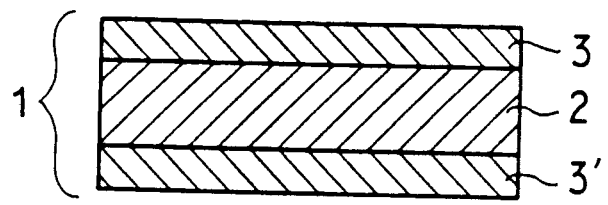
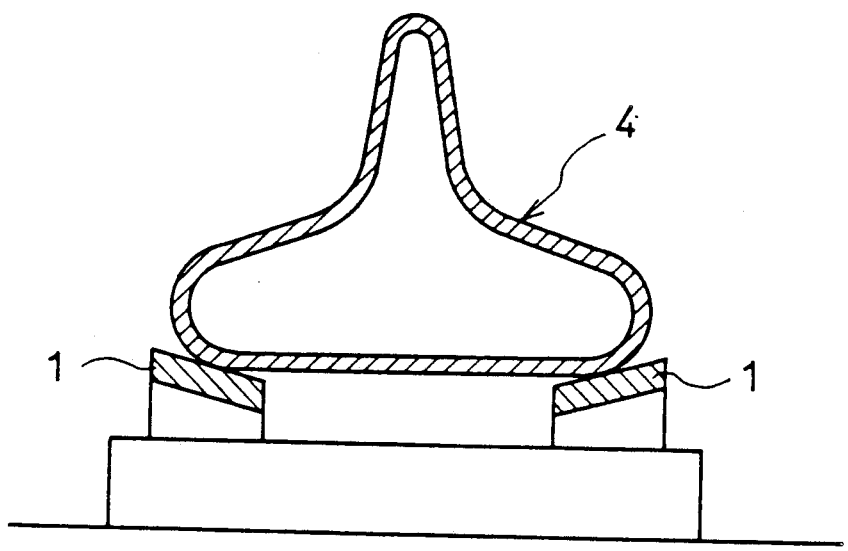
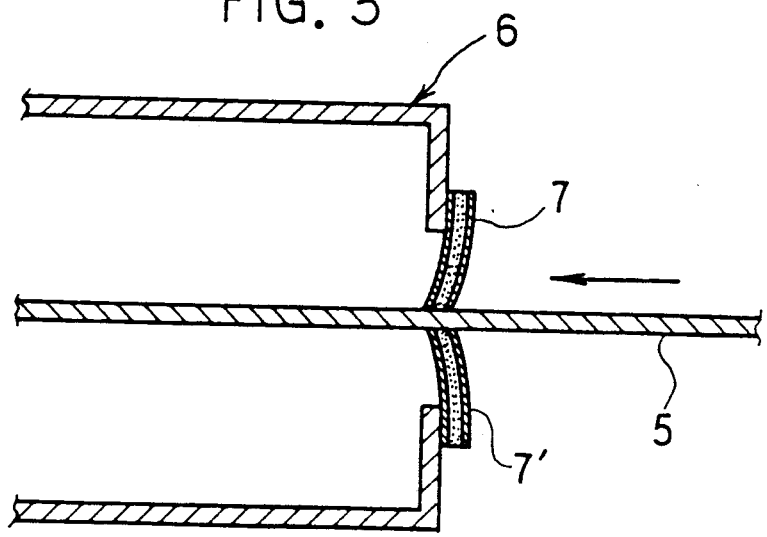

COMPOSITE NON-WOVEN FABRIC MATERIAL

CROSS-REFERENCE TO RELATED APPLICATION

This application is related to Japanese application No. 63/164,298 filed June 30, 1988, the entire specification of which is incorporated herein by reference.

FIELD OF THE INVENTION

The present invention relates to a non-woven fabric material useful in preparing cushions, conveyer belts, bag filters, sealing materials, etc. which can be used at elevated temperatures.

TECHNOLOGY REVIEW

Heat resistant materials used for the above mentioned-products are known and include both non-woven material formed of a single fiber, and layered non-woven materials of at least two fibers.

Non-woven materials may be formed exclusively of asbestos fiber, stainless steel fiber and like heat resistant fibers. Asbestos material has been heretofore widely used since it is low-priced and has excellent heat resistivity. However, the use of asbestos is now strictly regulated in view of environmental and public health concerns because filaments of asbestos floating in air are now known to have adverse effects on human health.

Although the stainless steel fabrics are excellent in heat resistance, flexibility, springiness or cushioning property, etc., the high cost thereof poses a difficulty in wide use in various fields.

Unexamined Japanese Patent Publication No. 24572 of 1975 discloses a layered fabric material comprising a compacted mass of metal fibers such as stainless steel fibers or the like and a compacted mass of inorganic fibers such as rockwool fiber, glass fiber, asbestos fiber or the like. This material is produced by bonding the fiber masses with needle punching and firing the bonded fiber masses to form an interlocked layer at the interface of the fiber masses.

In the case of a layered material comprising a rockwool fiber or asbestos fiber and a metal fiber, the firing step is required to firmly hold the two layers together since the bonding force formed between the interlocked layers by needle-punching alone is too weak to keep the layers integral. However, the need to use a firing step makes this whole manufacturing process complicated, and the product obtained shows lowered springiness or cushioning property.

When the layered material is formed of a glass fiber and a metal fiber, its use is limited because the heat conductivity of glass fiber is low.

SUMMARY OF THE INVENTION

The present invention provides a composite non-woven fiber material comprising at least one stainless steel fiber layer and at least one carbon fiber layer, the stainless steel layer and the carbon fiber layer being intimately interlocked to form integrated composite, bonded therebetween, at least one exposed surface layer of the composite material being a stainless steel fiber layer.

An object of the invention is to provide a composite non-woven fabric material which can be easily produced at a reasonable cost.

Another object of the invention is to provide a composite non-woven fabric material which exhibits strong bonding between the different fabric layers.

Another object of the invention is to provide a composite non-woven fabric material which is stable at high temperatures.

Another object of the invention is to provide a composite non-woven fabric material which has good lubricating properties.

Other objects and features of the invention will become apparent from the following description.

BRIEF DESCRIPTION OF THE DRAWINGS

FIG. 1 shows a cross section of the composite non-woven fabric material according to the invention.

FIG. 2 shows use of the composite material of the invention as cushioning element.

FIG. 3 shows use of the composite material of the invention as sealing element.

DETAILED DESCRIPTION OF THE INVENTION

Carbon fibers to be used in the invention may be selected from those produced from pitch materials and from organic polymers such as polyacrylonitrile (PAN), etc. The ratio of weight per area of a single carbon fiber layer is not critical, but it is usually from about 30 to about 2500 g/m$^2$, preferably from about 50 to about 2300 g/m$^2$. If the ratio is less than 30 g/m$^2$, the amount of carbon fiber layer is greatly reduced and the advantage in cost of using carbon fiber layer together with stainless steel layer is lost. If the ratio exceeds 2500 g/m$^2$, the filaments positioned at the intermediate portions of the carbon fiber layer cannot interlock intimately with the filaments of the stainless steel fiber layer and the composite is prone to separate at the intermediate of the carbon fiber layer when a shearing force is applied to the composite. In order to improve the resistance to separation of composite material, a thin stainless steel fiber layer may be incorporated within the carbon fiber layer.

The ratio of weight per area of a single stainless steel layer is also not critical, but it is usually from about 50 to about 2500 g/m$^2$, preferably from about 120 to about 2000 g/m$^2$. When the ratio is less than 50 g/m$^2$, a uniform stainless steel fiber layer is difficult to prepare and an uneven fiber layer exhibits poor heat resistance and abrasion resistance. When the ratio is over 2500 g/m$^2$, the relative amount of expensive stainless steel fiber is increased and the cost effectiveness of the invention will be reduced. The diameter of the filaments forming the stainless steel fiber is usually from about 2 to about 50 $\mu$m. When the composite material of the invention is used as heat resistant cushioning material, the diameter of stainless steel fiber preferably is from about 5 to about 20 $\mu$m. When the stainless steel fiber is formed of filaments with a small diameter of less than 2 $\mu$m, the fiber is prone to fracture. With the diameter of filaments of more than 50 $\mu$m, needle-punching step becomes difficult because needles used are easily broken.

The number of each of layers of the stainless steel fibers and the carbon fibers are not limited and variable as required. For example, the composite material according to the invention may have a two layer-structure of a single carbon fiber layer and a single stainless steel fiber layer, or a three layer-structure of two stainless steel layers and a carbon fiber layer interposed therebetween, or a multi-layer-structure wherein at least two carbon fiber layers and at least two stainless steel layers are alternately laminated. The composite material of the invention may include an intermediate layer or layers between the carbon fiber layer and the stainless steel fiber layer in order to improve tensile strength of the composite. The intermediate layer may be glass fiber cloth, stainless steel fiber cloth, etc.

It is essential for the composite material of the invention to have a stainless steel fiber layer on at least one exposed surface of the composite. The upper limit of the temperature at which the carbon fiber may be used in air is about 400 to about 450° C. whereas stainless steel fibers are useful at temperatures up to about 600° C. Thus, the composite of the invention can contact hot articles or interrupt or shut off hot air with the stainless steel fiber layer exposed to the hot article or hot air. The composite with the surface stainless steel fiber layer is also useful in cases where it is used at temperatures below 400° C. but the carbon fiber layer has to be mechanically reinforced.

The stainless steel fiber layer and the carbon fiber layer are integrated into a composite through the interlocking of filaments of both layers. If the both layers are bonded with an inorganic adhesive which is stable at high temperatures over 400° C., the resultant product is low in flexibility and the product application will therefore be limited. When an organic adhesive is used, the bonded product cannot be used at elevated temperatures.

Various method for integrating the stainless steel fiber layer and the carbon fiber layer by interlocking filaments of both layers may be used. Preferably, both layers are combined by needle punching. The integrated product obtained by needle punching shows high resistance to separation of layers due to intimate interlocking of filaments of both fiber layers and good springiness or cushioning properties. The composite of the invention may also be produced by interlocking the filaments of both fiber layers with use of a water jet loom.

The composite material of the invention is not limited in thickness. Products with about 3 to about 50 mm in thickness can easily be prepared.

The composite non-woven fiber material of the invention has a wide variety of uses which include: heat resisting cushioning material useful, for example, for supporting and relieving mechanical and/or thermal shock to glass products such as cathode ray tube processed at high temperatures; conveyer belt for carrying heated articles; sealing material for shutting off extremely hot gases; filter material used at high temperatures, etc.

The total heat conductivity of the composite can be varied when required by changing the relative thicknesses of the stainless steel fiber layer and the carbon fiber layer.

The stainless steel fiber layer formed on at least one exposed surface of the composite material of the invention functions as a heat insulator and can protect a carbon fiber layer integrated therewith against oxidation due to hot atmosphere over 400° C. Thus, the composite of the invention can, at high temperatures, replace the expensive non-woven fabric made of stainless steel fiber alone. Even at lower temperatures, the composite of the invention economically replace non-woven fabric of stainless steel fiber alone which is used for its excellent chemical resistance, flexibility, springiness, bending property, abrasion resistance, etc.

In addition, when the carbon fiber layer comes into contact with a moving article or element, it ensures a high abrasion resistance because of its good lubricating property.

In sum, the composite material of the invention shows an excellent durability under differing conditions resulting from the various improved properties mentioned above.

Given below are examples to illustrate the invention with reference to the accompanying drawings, without limiting the scope of the invention.

EXAMPLE 1

FIG. 1 is a cross section of a composite material of the invention.

The composite material 1 was prepared by placing on both sides of a carbon fiber layer 2 two stainless steel fiber layers 3, 3′ and then needle-punching (925 punches/inch$^2$) the layers together to form the integrated composite.

The carbon fiber layer 2 was formed by a non-woven fabric prepared from pitch carbon fibers (13 μm in diameter, specific gravity=1.65, tensile strength=70 kg/mm$^2$, elastic modulus=3.5 ton/mm$^2$) using a carding machine. The ratio of weight per unit are was 260 g/m$^2$.

The stainless steel fiber layer 3 was a web formed from stainless steel fiber (trade mark "Nasron", product of Nihon Seisen Kabushiki Kaisha, Japan: 12 μm in diameter, specific gravity=7.9, elastic modulus=20000 kg/mm$^2$). The ratio of weight per unit area was 500 g/m$^2$.

The characteristics of the composite material 1 were as follows:
ratio of weight per unit area; 900 g/m$^2$
thickness; 5–5.5 mm
bulk density; 0.18 g/cm$^3$

COMPARISON EXAMPLE 1

A non-woven fabric was prepared by needle punching (766 punches/inch$^2$) a fiber layer formed of stainless steel fiber alone.

The characteristics of the non-woven fibric obtained were as follows.
ratio of weight per unit area; 1500 g/m$^2$
thickness; 5–5.5 mm
bulk density; 0.3 g/cm$^3$ Evaluation of properties (1) Flexibility Each of the products obtained in Example 1 and Comparative Example 1 was tested for bending resistance in accordance with JIS(Japanese Industrial Standards)-L-1096 6-20-1.

The bending resistance of material of Example 1 was 6220 mg while the value for the material of Comparative Example 1 was found to be 6800 mg.

Thus, it was confirmed that the product of Example 1 was substantially similar to the product of Comparison Example 1 in flexibility.

(2) Heat conductivity

Each of the products of Example 1 and Comparative Example 1 was placed on a plate kept at 300° C. and was checked for the rise of temperature at the surface of the product after 3 minutes.

The temperature of the product of Example 1 was 190° C. whereas the temperature of product of Comparative Example 1 was 195° C.

It was confirmed from the results of these tests that both products were substantially the same in heat condictivity.

(3) Cushioning property at elevated temperature

The product 1 of Example 1 was used for supporting cathode ray tubes 4 at 600° C. in a step of glass processing as shown in FIG. 2.

After 6 weeks, it was found that the product of Example 1 showed little change in thickness and shape and had a similar properties as the product of Comparative Example 1 in heat resistance and was capable of effectively protecting fragile cathode ray tubes from mechanical and thermal shocks.

(4) Abrasion resistance

Each of the products obtained in Example 1 and Comparative Example 1 was tested for abrasion resistance in accordance with JIS-L-1021-612 using an abrasion ring of H38 and a load of 500 g.

The results after 1000 rotations were 705 for the product of Example 1 and 980 for Comparative Example 1. These values are expressed with the amount of weight loss multiplied by 1000.

The results indicate that the product of Example 1 has substantially the same abrasion resistance as the product of Comparative Example 1.

The smaller weight loss of the product of Example 1 than that of Comparative Example 1 may be attributable to the higher number of punches/inch$^2$ employed in Example 1.

(5) Durability

The composite material obtained in Example 1 was evaluated for durability as the sealing elements 7, 7' of an annealing furnace 6 kept at 900° C. into which a sheet of stainless steel 5 was continuously introduced at a speed of 200 m/min as shown in FIG. 3. The nonwoven fabric obtained in Comparative Example 1 was also used as the sealing elements under the same conditions as the product of Example 1.

Each sealing element 7 or 7' was 1700 mm × 300 mm in size and lightly pressed against the stainless steel sheet 5 to hermetically close the furnace.

The sealing elements 7, 7' prepared from the product of Comparative Example 1 had to be replaced only after 2 months because filaments of the stainless steel fiber were gradually broken and lost due to high abrasion thereof in contact with the stainless steel sheet 5.

In contrast, the sealing elements 7, 7' prepared from the product of Example 1 could be used for 4 months without any difficulty. The remarkable result may be attributable to the fact that the product of Example 1 has the carbon fiber layer 2 exposed at the end portion which exhibits a good lubricating property against the stainless steel sheet 5.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A composite non-woven fiber material comprising at least one stainless steel fiber layer and at least one carbon fiber layer, said at least one stainless steel fiber layer and said at least one carbon fiber layer being alternately intimately interlocked to form integrated composite material, at least one surface layer of said integrated composite material being a stainless steel fiber layer.

2. A composite non-woven fiber material according to claim 1 wherein the ratio of weight per area of a carbon fiber layer is from about 30 to about 2500 g/m$^2$.

3. A composite non-woven fiber material according to claim 2 wherein said ratio is from about 50 to about 2300 g/m$^2$.

4. A composite non-woven fiber material according to claim 1 wherein the ratio of weight per area of a stainless steel fiber layer is from about 50 to about 2500 g/m$^2$.

5. A composite non-woven material according to claim 4 wherein said ratio is from about 120 to about 2000 g/m$^2$.

6. A composite non-woven fiber material according to claim 1 wherein the diameter of a filament forming a stainless steel fiber layer is from about 2 to about 50 μm.

7. A composite non-woven fiber material according to claim 1 wherein the alternate layers of stainless steel fibers and carbon fibers are needle-punched together to form said integrated composite material.

8. In an annealing furnace, the improvement comprising at least one sealing element of a composite non-woven fiber material comprising at least one stainless steel fiber layer and at least one carbon fiber layer, said at least one stainless steel fiber layer and said at least one carbon fiber layer being alternately intimately interlocked to form an integrated composite material, at least one surface layer of said integrated composite material being a stainless steel fiber layer.

9. The sealing element according to claim 8 wherein the ratio of weight per area of a carbon fiber layer is from about 30 to about 2500 g/m$^2$.

10. The sealing element according to claim 9 wherein said ratio is from about 50 to about 2300 g/m$^2$.

11. The sealing element according to claim 8 wherein the ratio of weight per area of a stainless steel fiber layer is from about 50 to about 2500 g/m$^2$.

12. The sealing element according to claim 11 wherein said ratio is from about 120 to about 2000 g/m$^2$.

13. The sealing element according to claim 8 wherein the diameter of a filament forming a stainless steel fiber layer is from about 2 to about 50 μm.

14. A composite non-woven fiber material according to claim 8 wherein the alternate layers of stainless steel fibers and carbon fibers are needle-punched together to from said integrated composite material.

15. In a high temperature cushion useful in glass processing, the improvement comprising at least one high temperature cushioning element of a composite non-woven fiber material comprising at least one stainless steel fiber layer and at least one carbon fiber layer, said at least one stainless steel fiber layer and said at least one carbon fiber layer being alternately intimately interlocked to form an integrated composite material, at least one surface layer of said integrated composite material being a stainless steel fiber layer.

16. The high temperature cushioning element according to claim 15 wherein the ratio of weight per area of a carbon fiber layer is from about 30 to about 2500 g/m².

17. The high temperature cushioning element according to claim 16 wherein said ratio is from about 50 to about 2300 g/m².

18. The high temperature cushioning element according to claim 15 wherein the ratio of weight per area of a stainless steel fiber layer is from about 50 to about 2500 g/m².

19. The high temperature cushioning element according to claim 18 wherein said ratio is from about 120 to about 2000 g/m².

20. The high temperature cushioning element according to claim 15 wherein the diameter of a filament forming a stainless steel fiber layer is from about 2 to about 50 μm.

21. The high temperature cushioning element according to claim 15 wherein the alternate layers of stainless steel fibers and carbon fibers are needle-punched together to from said integrated composite material.

* * * * *